INVENTOR
STURE GEORG RANÖ

BY *Earle R. Marden*
ATTORNEY

United States Patent Office 3,449,186
Patented June 10, 1969

3,449,186
METHOD OF SPLICING TWO SECTIONS OF PLASTIC COATED WEB MATERIAL
Sture Georg Ranö, Lund, Sweden, assignor to AB Tetra Pak, Lund, Sweden, a company of Sweden
Filed Oct. 22, 1965, Ser. No. 501,694
Claims priority, application Sweden, Jan. 13, 1965, 371/65
Int. Cl. B29b 27/02; B32b 31/18
U.S. Cl. 156—159     5 Claims

ABSTRACT OF THE DISCLOSURE

Method of splicing two sections of web material together. Each section has at least one layer of heat sealable material coated thereon. A wedge shaped section is torn from each section and the heat sealable portion of one section is placed on the torn portion of the other and the two sections are heat sealed together.

---

Figure 1:
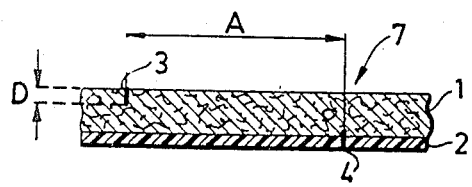

The present invention relates to plastic coated web-like materials, preferably plastic coated paper webs which have found considerable use in the art of packaging. The invention relates to a method of splicing such webs of material and, furthermore, to prepare in advance the webs of material in order to facilitate splicing when using the material for instance in a dairy.

In previously known methods for splicing web-like materials various forms of gluing or taping of the portions of material to be spliced have been used. The characteristic features of these methods are among other things that they are generally inexpensive and in many cases relatively simple to use, and these properties are, of course, of a positive kind. However, a characteristic feature is also that the thicknes of the web is increased in the splice itself. This cannot be tolerated in certain cases. It has therefore been proposed to use a method of splicing plastic coated web-like materials, which method briefly implies that the portions to be spliced are cut in such a way that they will present wedge-like sections. The portions are then placed on top of each other so that the plastic coated surface of one portion rests against the cut surface of the second portion, whereupon the surfaces are heat-sealed. As a result hereof, an even and durable splice is obtained. The cutting operation is carried out by means of a device consisting inter alia of a metal sheet having a large radius, over which the material is stretched, and a cutting member in the nature of a plane. The method implies considerable difficulties since the quality of the cut surface varies considerably.

To equip existing machines for using the web-like material with such devices, e.g. machines for packaging liquids, is not practical, and this is a great disadvantage.

In order to eliminate these drawbacks the invention aims at providing a new and practical method of splicing web-like materials coated with heat-sealable plastic, the outer two surfaces of the material being provided each with a cut penetrating to a certain depth in the material and extending from one margin of the material to the other, said cuts being displaced a certain distance in relation to each other so that after tearing of the material along the tearing notches formed by the cuts the material will present an essentially wedge-like section in the tearing area and, furthermore, that two portions which have been torn in this way in order to be spliced are placed on top of each other in such a way that the plastic coated surface of one portion rests against and covers the torn surface of the other portion, whereupon the surfaces are heated-sealed.

A modification of the invention aims at a method of splicing a web-like material coated on one side with heat-sealable plastic, characterized in that the plastic coated surface is provided with a cut penetrating to a certain depth in the material, and that on the other surface there is disposed an abutment displaced a certain distance in relation to the said cut so that after tearing of the material along the tearing notches formed by the cut and the abutment, the said material will present, in the tearing area, an essentially wedge-like section, and furthermore that two portions which have been torn in this manner in order to be spliced are disposed and heat-sealed in the way described.

The invention also relates to a plastic coated web-like material which is characterized in that at its two short ends or along its longitudinal margins it is provided with tearing notches in the nature of cuts.

Figure 2:
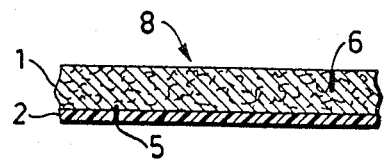
Figure 3:
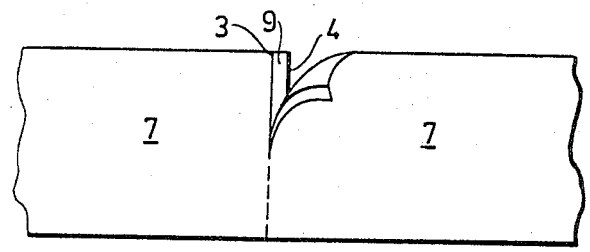
Figure 4:
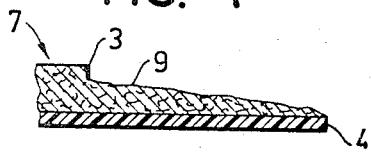
Figure 5:
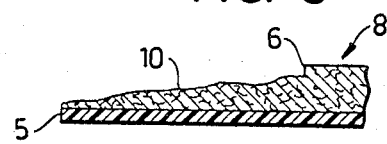
Figure 6:
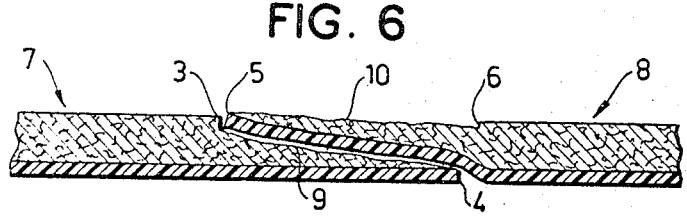
Figure 7:
Figure 8:
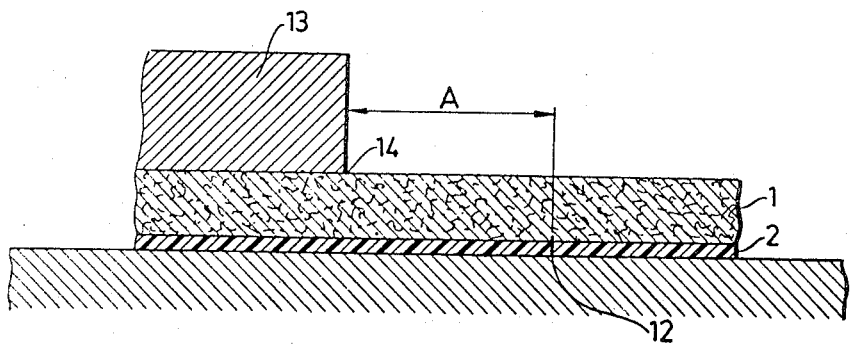
Figure 9:
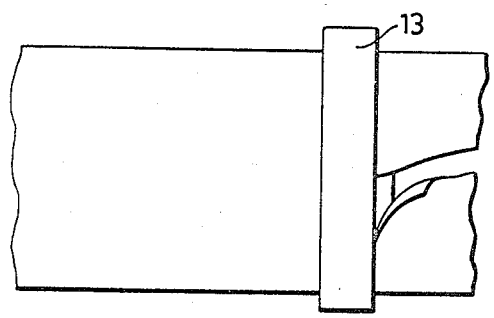
Figure 10:
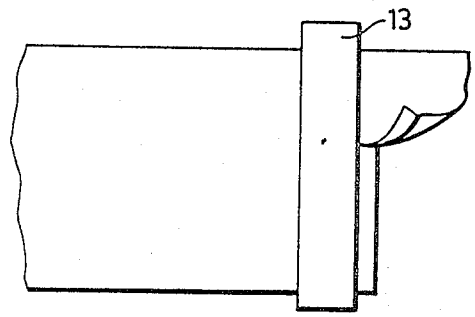

Further objects and advantages of the invention will be apparent from the accompanying drawings showing an embodiment of the invention chosen by way of example, and where FIGS. 1 and 2 shows sections of web-like material which have been provided with tearing notches in the form of cuts in order to be spliced, FIG. 3 shows material seen from above while being torn, FIGS. 4 and 5 shows the materials in FIGS. 1 and 2 after the tearing operation has been completed, FIG. 6 shows how the ends of the material are placed on top of each other in order to be spliced, FIG. 7 shows the finished product, FIG. 8 shows a modification of the invention, in which one of the tearing notches has been replaced by an abutment, FIGS. 9 and 10 finally show how the material is meant to be torn in accordance with the said modification.

In the FIGS. 1 and 2 the two portions 7 and 8 to be spliced consist of web-like materials 1, e.g. paper, coated with plastic 2 or a similar material. The web-like material is preferably wound on rollers. By punching, cutting or in another suitable manner the material has been provided with cuts 3, 4, 5, 6 in order to form tearing notches. According to the figures the cuts extend from one margin of the material to the other, forming angles of 90° with the margins. Other angles may also occur, however, and the longitudinal margins may be provided with tearing notches in the nature of cuts. These latter cuts are utilized in order to obtain even seals, for instance when the web-like material is intended to be shaped into a tube and to be sealed longitudinal along its longitudinal margins united with each other at the forming of the tube.

A tearing notch consists of a cut 3 in one material surface 1 and a cut 4 in the other material surface 2. The parallel cuts 3, 4 penetrate to a suitable depth and are displaced a distance A in relation to each other, which is of the size 5 to 25 mm. Preferably, the two ends of a roller of material are provided with tearing notches already at the manufacturing process. Of course, if necessary, a roller may be provided with still more tearing notches in order that before a roller has still been used up it may for instance be possible to change to another roller, the material surface of which has a different pattern or some other desired property. The tearing notches may be difficult to discover and are therefore preferably marked, e.g. in colours.

A splice between two material rollers (not shown in the figure) may take place in the following manner.

The portion 7 in FIG. 1 is assumed to be part of the end of a roller I which when used up, i.e. when being almost completely wound off from the roller, is meant to be spliced to another roller II, of which the detail 8 shown in FIG. 2 is a portion in its beginning. The portions 7 and 8 are provided with tearing notches in the nature of cuts 3 to 6, which are easy to discover with the aid of special markings.

As an alternative, the tearing notches may, of course, be disposed also when the material is being used. FIG. 3 shows distinctly how the tearing of material is done. The tearing operation may be carried out manually or using special means. Preferably, the roller is first torn, so that it is prepared when the roller is almost completely wound off from the roller and ready to be torn. When the tearing of both ends have the appearance shown in FIGS. 4 and 5, they present torn surfaces 9 and 10 extending between the cuts 3, 4 and 5, 6, respectively, so that essentially wedge-like sections are formed. When splicing the portions 7 and 8, the end of the portion 8 is placed on the end of the portion 7, as show in FIG. 6, so that the plastic coated surface 2 of the portion 8 will rest against the torn surface 9 of the portion 7. If the overlap is such that the cuts 3 and 5 rest against each other, a transition between the spliced portions which is almost completely evenly thick is obtained when the splice is heat-sealed.

At the heat-sealing operation, which preferably takes place in jaws, there is fusing of the plastic which rests against the torn surface 9, the plastic flowing into all irregularities in the torn surface 9 and forming a durable splice. FIG. 7 shows the finished product. The transition 11 between the plastic coated surfaces of the materials becomes even and completely sealed. The torn surface 10 of the portion 8 is still somewhat uneven. However, this is of secondary importance since the plastic coated surface 2 is meant to constitute the inside of the package for which the material is meant to be used.

According to FIG. 8 one of the cuts has been replaced by an abutment 13. This should preferably present a sharp edge 14 so that an even torn edge is obtained. As distinguished from the material according to FIGS. 1 to 7, which may be provided with a thermoplastic material on both sides, the material according to FIG. 8 is provided with a plastic material on one side only. On this side a cut 12 is disposed. The cut 12 and the abutment 13 are displaced a distance A from each other, corresponding to the distance between two cuts according to the previous alternative.

FIGS. 9 and 10 show how the tearing of the material is meant to be carried out. As appears from FIG. 10, it is advantageous to start tearing the material in the central portion of the tearing notch.

The method according to FIG. 8 may also, of course, be used for longitudinal splicing of a web-like material. The said material, provided with a cut 12 at each longitudinal margin, may be moved continuously or intermittently past a stationary abutment 13 and may be torn in the intended manner, whereupon the material is reshaped so as to form a tube, the wedge-like sections formed at the tearing operation being placed on top of each other and being heat-sealed so as to form a longitudinal joint.

The invention is not limited to the embodiment shown. Certain modifications within the scope of the invention idea are possible. It is, for instance, possible to provide a material with four cuts, disposed in pairs, so that a strip of the material can easily be torn off.

That which is claimed is:

1. A method of splicing two sections of web-like material each having at least one layer of heat sealable plastic coated thereon comprising the steps of penetrating each of said sections certain predetermined depth, tearing said sections adjacent said penetrations to form wedge-like sections in the torn area, placing the layer of heat sealable plastic of one of said sections over the torn surface of the other of said sections and heat sealing said layer of heat sealable plastic of said one of said sections to the torn surface of the other of said sections.

2. The method of claim 1 wherein said penetrations are formed by cutting.

3. The method of claim 1 wherein said penetrations are formed by punching.

4. A method of splicing two sections of web-like material each having at least one layer of heat sealable material coated thereon comprising the steps of penetrating each section of web-like material a certain predetermined depth, penetrating each layer of heat sealable material a certain predetermined depth longitudinally spaced from said penetration in said web-like material, tearing said sections from said penetration in heat sealable layer to said penetration in said web-like material to form a wedge-shaped section, placing the layer of heat sealable plastic of one of said sections over the torn surface of the wedge shaped section of the section of the web-like material and heat sealing said heat sealable plastic layer to said torn surafce of said wedge-shaped section.

5. A method of splicing two sections of web-like material each having at least one layer of heat sealable material coated thereon comprising the steps of penetrating each of said layers of heat sealable material a certain predetermined depth, placing an abutment adjacent the surface of each section of web-like material a certain predetermined longitudinal distance from said penetrations in said heat sealable layer, tearing each of said sections from said abutment to said penetrations in said heat sealable layer to form the end of said sections into a wedge shape, placing the layer of heat sealable plastic of one of said sections over the torn surface of the wedge shape of the other of said sections and heat sealing said layer of heat sealable material to said torn surface.

References Cited

UNITED STATES PATENTS 2,770,080  11/1956  Hoyt _____ 156—258 XR
2,431,035  11/1947  Goepfert et al. ___ 156—258 XR
3,227,594  1/1966  Ryan _____ 156—159

PHILIP DIER, *Primary Examiner.*

U.S. Cl. X.R.

156—257, 258; 161—38